(12) United States Patent
Reichert et al.

(10) Patent No.: US 12,071,012 B2
(45) Date of Patent: Aug. 27, 2024

(54) DEVICE AND METHOD FOR PROJECTING IMAGE DATA ONTO A PROJECTION SURFACE OF A VEHICLE WINDOWPANE

(71) Applicant: DAIMLER AG, Stuttgart (DE)

(72) Inventors: Steffen Reichert, Bad Liebenzell (DE); Oliver Sens, Wiesbaden (DE); Zane Amiralis, Nagold (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 114 days.

(21) Appl. No.: 17/606,179

(22) PCT Filed: Mar. 19, 2020

(86) PCT No.: PCT/EP2020/057651
§ 371 (c)(1),
(2) Date: Oct. 25, 2021

(87) PCT Pub. No.: WO2020/216537
PCT Pub. Date: Oct. 29, 2020

(65) Prior Publication Data
US 2022/0212539 A1 Jul. 7, 2022

(30) Foreign Application Priority Data
Apr. 26, 2019 (DE) .......................... 102019003039.7

(51) Int. Cl.
*B60K 35/00* (2024.01)
*G06T 7/30* (2017.01)
(Continued)

(52) U.S. Cl.
CPC ................ *B60K 35/00* (2013.01); *G06T 7/30* (2017.01); *G06T 7/55* (2017.01); *G06T 7/90* (2017.01); *B60K 2360/334* (2024.01)

(58) Field of Classification Search
CPC .............. B60K 35/00; B60K 2370/334; B60K 2370/149; B60K 2370/1529;
(Continued)

(56) References Cited

U.S. PATENT DOCUMENTS 5,214,413 A * 5/1993 Okabayashi ............. G09G 3/02
345/7
11,011,137 B2 * 5/2021 Higashiyama ..... G02B 27/0101
(Continued)

FOREIGN PATENT DOCUMENTS

CN 102129154 A 7/2011
CN 108463766 A 8/2018
(Continued)

OTHER PUBLICATIONS

International Search Report mailed Jul. 16, 2020 in related/corresponding International Application No. PCT/EP2020/057651.
(Continued)

*Primary Examiner* — Andrae S Allison
*Assistant Examiner* — Emmanuel Silva-Avina
(74) *Attorney, Agent, or Firm* — PATENT PORTFOLIO BUILDERS PLLC

(57) ABSTRACT

A device and a method for projecting image data onto a projection surface of a vehicle windowpane of a vehicle. An image data processing unit generates second image data from first image data based on recorded surroundings brightness of the vehicle. A gradation curve is used to generate the second image data in such a way that dark image regions of the first image data lying below a predetermined color brightness threshold compared to image regions lying above the color brightness threshold in the first image data are brightened in the second image data compared to the first image data with regard to color or greyscale spectra. A degree of brightening of the dark image regions in the first
(Continued)

Figure 1:
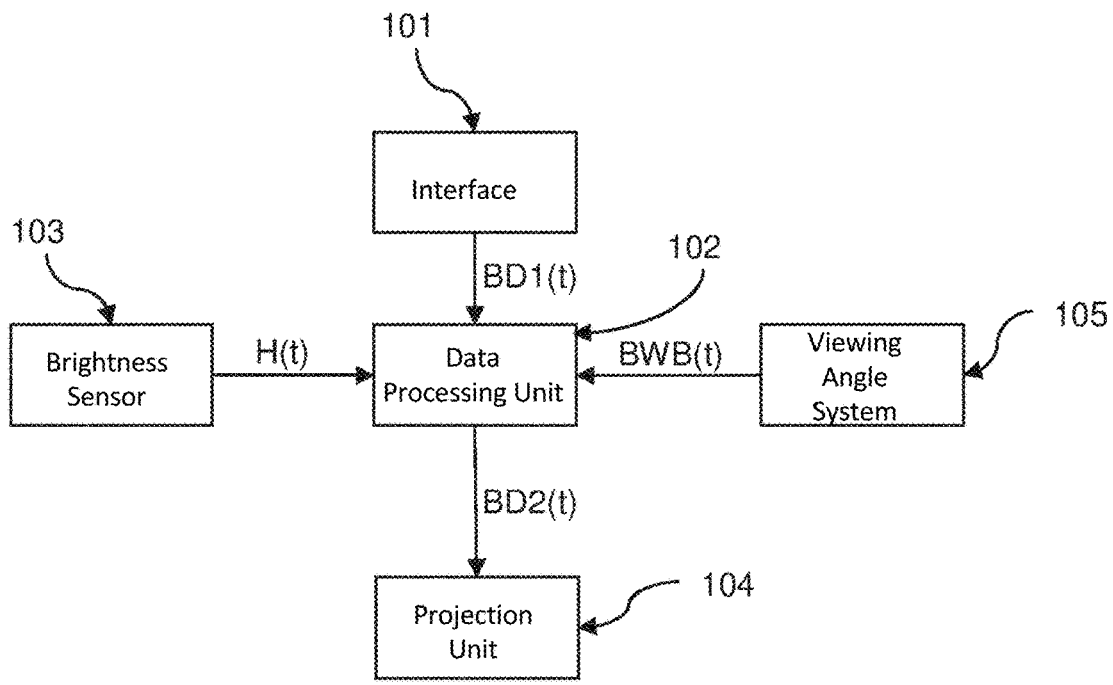

image data increases with an increase in the recorded surroundings brightness.

15 Claims, 2 Drawing Sheets

(51) Int. Cl.
*G06T 7/55* (2017.01)
*G06T 7/90* (2017.01)

(58) Field of Classification Search
CPC ........ B60K 2370/168; B60K 2370/349; G06T 7/30; G06T 7/55; G06T 7/90; G02B 27/0101; G02B 2027/0118; G02B 2027/0138; G02B 2027/014
USPC .......................................................... 382/104
See application file for complete search history.

(56) References Cited

U.S. PATENT DOCUMENTS

| | | | | |
|---|---|---|---|---|
| 2011/0102483 A1* | 5/2011 | Kanamori | ............. | G09G 3/002 345/7 |
| 2014/0152711 A1* | 6/2014 | Sekiya | ................. | H04N 9/3194 345/690 |
| 2018/0124364 A1* | 5/2018 | Yata | ..................... | H04N 9/3167 |
| 2018/0129050 A1 | 5/2018 | Hayashi et al. | | |
| 2018/0226007 A1 | 8/2018 | Yamada | | |
| 2018/0267307 A1 | 9/2018 | Yoshida et al. | | |

FOREIGN PATENT DOCUMENTS

| | | |
|---|---|---|
| DE | 102006050016 A1 | 4/2008 |
| DE | 102012204303 A1 | 9/2013 |
| DE | 102015215180 A1 | 2/2017 |
| DE | 102016223908 A1 * | 6/2018 |
| DE | 102016223908 A1 | 6/2018 |
| JP | 2007195045 A | 8/2007 |
| JP | 2014130287 A | 7/2014 |
| JP | 2018116082 A | 7/2018 |
| WO | 2017201384 A1 | 11/2017 |

OTHER PUBLICATIONS

Office Action created Nov. 19, 2019 in related/corresponding DE Application No. 10 2019 003 039.7.
Written Opinion mailed Jul. 16, 2020 in related/corresponding International Application No. PCT/EP2020/057651.
Office Action dated Apr. 30, 2024 in related/corresponding CN Application No. 202080030721.

* cited by examiner

DEVICE AND METHOD FOR PROJECTING IMAGE DATA ONTO A PROJECTION SURFACE OF A VEHICLE WINDOWPANE

BACKGROUND AND SUMMARY OF THE INVENTION

Exemplary embodiments of the invention relate to a device for projecting image data onto a projection surface of a vehicle windowpane of a vehicle, as well as to a method for operating such a device and a vehicle having such a device.

Devices for projecting image data onto a projection surface of a vehicle windowpane are known in the prior art as so-called "Head-Up Displays, HUD". Typically, such devices are used for projecting navigation data, vehicle operating data and multimedia data, which control multimedia applications in a vehicle. Typically, the projected image data can only be recognized by the driver.

In the projection systems known in the prior art (HUDs), the image data are projected onto a projection surface of a vehicle windowpane. Here, the vehicle windowpane can be any windowpane of a vehicle, for example a front windowpane, a side windowpane . . . etc. The respective vehicle windowpane and the projection surface of the vehicle windowpane are transparent, i.e., clear. During the projection of the image data, image content is projected by a projector onto the projection surface by means of beams of light. The beams of light are reflected on the projection surface in the direction of an observer, such that the image content is visible to the observer.

Furthermore, projection systems are known that project different image data onto two different projection surfaces of a vehicle windowpane.

Thus, a display device in a vehicle is known, for example, from the printed publication DE 10 2006 050 016 A1, wherein the vehicle has a sensor arrangement for determining the viewing direction of a driver of the vehicle, and the display device has two separate projection surfaces on the vehicle windowpane. Here, the display device is controlled by a display controller in such a way that information relating to the vehicle is displayed either on the first projection surface or the second projection surface depending on the viewing direction of the driver.

The depiction of moving images, e.g., videos, in the field of vision of the driver is not permitted by law due to distracting the driver.

In the prior art, so-called "multimedia HUDs" are furthermore known, which allow personalized media content to be depicted for the driver and passenger without them being visible to the other person in each case. At present, these systems are particularly interesting for the passenger in particular, wherein the driver is not distracted or disturbed by the image content only visible to the passenger.

In future autonomously driving vehicles, such projection systems will, in all likelihood, also be used to project image content moving for the driver if the vehicle is moving autonomously. As a result of the respectively individually projected image content, such a multimedia HUD enables the individual consumption of image data, image data streams in vehicle, buses, taxis, or other forms of public transport.

Exemplary embodiments of the present invention are directed to an improved device for projecting image data onto a projection surface of a vehicle windowpane, which enables, in particular, disruption-free and non-tiring enjoyment of the projected image data.

The invention is based on the following understanding of the inventors.

With a projection of image data onto a projection surface of a vehicle windowpane using a projection system known in the prior art, the image contrast emerges due to the brightness difference between light and dark pixel content. The darkest image content is presently said to be "purely black". With the projection of the image content "purely black" onto an image pixel (image point) of the projection surface, no beam of light is thus emitted and, accordingly, no beam of light starting from the projection system is also reflected in this image point (pixel) in the direction of the observer. In principle, the pixel of the projection surface thus has the brightness, color or tone value of the projection surface.

Since the projection surface is transparent, i.e., clear, the result is that the observer perceives the surroundings lying behind the image point in the viewing direction of the observer in this image point, such that this image point assumes the brightness, color or tone value of the corresponding surroundings instead of "purely black". Since the vehicle is typically moving, the corresponding surroundings are also constantly changing, which a viewer of the image data deems to be disturbing.

A non-tiring observation of the image data projected onto the projection surface furthermore requires the focus of the observer's eyes be maintained as far as possible on the projection surface. If the image data are projected onto the projection surface with a high amount of dark image content, then a correspondingly large transparent region emerges on the projection surface, on which region the observer perceives the surroundings lying behind the projection surface in the viewing direction. In this case, it results in the eyes of the observer alternatingly focusing on the projection surface (in the case of bright image content) and the surroundings lying behind the projection surface (in the case of dark image content). This change of focus is disruptive and tiring for the observer. With light vehicle surroundings, this effect is increased, while it is reduced in dark vehicle surroundings.

A first aspect of the invention relates to a device for projecting image data onto a projection surface of a vehicle windowpane of a vehicle, comprising: an interface for providing the image data $BD1(t)$, an image data processing unit connected to the interface for generating image data $BD2(t)$ from the image data $BD1(t)$, a brightness sensor connected to the image data processing unit for recording a surroundings brightness $H(t)$, and a projection unit connected to the image processing unit for projecting the image data $BD2(t)$ onto the projection surface of the vehicle windowpane, wherein the image data processing unit is designed and set up in such a way that, depending on the recorded surroundings brightness $H(t)$ for the generation of the image data $BD2(t)$ from the image data $BD1(t)$, a gradation curve $GK(H(t))$ is provided in such a way that dark image regions lying below a predetermined color brightness threshold in comparison to image regions lying above the color brightness threshold are brightened in terms of their color or greyscale spectrum in the image data $BD2(t)$ in comparison to the image data $BD1(t)$, wherein a degree of brightening of the dark image regions increases in the image data $BD2(t)$ with increasing surroundings brightness $H(t)$.

The gradation curve $GK(H(t))$ presently defines a bijective depiction f of brightness values in [%] of a region representing a color or greyscale spectrum SPEC:=[0% . . . 100%] in the same range SPEC:

$$f: \begin{cases} SPEC \to SPEC \\ \% \text{ IN} \to \% \text{ OUT} \end{cases}$$

where:
% IN: input brightness values of the image data BD1(t) provided
% OUT: brightness values of the image data BD2(t)
0%: minimum brightness=0="purely black"
100%: maximum brightness.

This means the definition region SPEC of the function f is identical to the target region SPEC of the function f. The region SPEC represents brightness values or color values or tone values of image pixels of the respective image data BD1(t) and BD2(t).

The gradation curve GK(H(t)) is presently changed depending on the determined surroundings brightness H(t).

Furthermore, the term "dark image regions" is presently to be understood, advantageously, as the image regions of the image data BD1 whose pixels have brightness vales in [%] ranging from 0% to 50%, in particular from 0% and 40% or from 0% to 30% or from 0% to 20% or from 0% to 15%.

In other words, the dark image regions lie below a predetermined threshold value of the brightness of their color or greyscale spectra such as 50%, 40%, 30%, 20% or 15%, for example. The brightness values of the grey and color values that are complementary in relation to said brightness values, i.e., lie above the predetermined threshold value, are thus to be referred to as "light image regions" of the image data BD1(T) and are emitted in the image data BD2(t) without brightening or at least with a lesser degree of brightening in relation to the dark image regions. Along with the brightening of the grey and color values, the light intensity can additionally be adjusted depending on the surroundings brightness, for example in dark surroundings such as when travelling through a tunnel, the intensity is reduced and in light surroundings is increased for a better recognition on the projection surface. The light intensity is changed by changing a brightness, measured in lumen, of the color or greyscale spectra irradiated by the light source of the projection unit.

The gradation curve GK(H(t)) is advantageously changed depending on the surroundings brightness H(t) ascertained in such a way that the input brightness value % IN=0: ="purely black" of the provided image data BS1(t) is mapped onto a brightness (target) value % OUT(% IN=0)>0 of the image data BD2(t). Here, the amount |% OUT(% IN=0)| of the brightness (target) value increases with increasing surroundings brightness H(t) or decreases with reducing surroundings brightness H(t).

If the surroundings brightness (e.g., during the night) is very low (a corresponding brightness threshold value GW can be predetermined), then the input brightness vale % IN=(="purely black") of the provided image data BD1(t) is advantageously mapped onto a brightness target value % OUT(% IN=0)=0:="purely black: of the image data BD2(t).

Advantageously, in this case when entering into a linear rectangular coordinate system, the gradation curve GK(H(t)) corresponds to the diagonal between the points (% IN=0, % OUT=0) and (% IN=100, % OUT=100).

With a surroundings brightness H(t)>0 or H(t)>GW, the gradation curve GK(H(t)) then runs constantly in the direction of its end point (% IN=100, % OUT=100), starting from a point: (% IN=0, % OUT>0). If the gradation curve GK is applied in a linear rectangular coordinate system, the gradation curve GK(H(t)) lies above a diagonal connecting the points: (% IN=0, % OUT=0) and (% IN=100, % OUT=100) advantageously for the input brightness value range % $IN_{B1}$ of [0% to 50%] and is identical to the diagonal connecting the points: (% IN=50, % OUT=50) and (% IN=100, % OUT=100) advantageously for the input brightness value range % $IN_{B2}$ of [50% to 100%].

According to the invention, the "brightening" or the "degree of brightening" of the dark image regions in the image data BD2(t) depends on the determined surroundings brightness H(t). Here, the degree of brightening of the dark image regions increases with increasing surroundings brightness H(t) and decreases with correspondingly decreasing surroundings brightness H(t). The degree of brightening of dark image regions is accordingly adapted in both directions depending on the determined surroundings brightness H(t). This means, in particular, that the gradation curve GK(H(t)) is correspondingly adjusted depending on the determined surroundings brightness H(t).

An advantageous development of the proposed device is characterized in that, furthermore, a system connected to the image data processing unit is present for generating a current viewing angle range BWB(t) at least of one occupant of the vehicle, wherein the image data processing unit is designed and set up in such a way that only the dark image regions in the image data BD2(t) are brightened, which lie in the viewing angle range BWB(t) during its projection onto the projection surface of the vehicle windowpane. An occupant of the vehicle can be, in particular, the driver or the passenger. Advantageously, the vehicle windowpane is a front windowpane or a side windowpane of the vehicle.

Advantageously, the brightness sensor is a camera sensor. Advantageously, the brightness sensor has a detection region that detects a brightness H(t) substantially of surroundings of the vehicle perceptible for an occupant through the projection surface. Thus, in particular the brightness H(t) of the surroundings section is measured, which is representative of the above-described defocusing effect emerging for an observer.

An advantageous development of the proposed device is characterized in that the image data processing unit is designed and set up in such a way that, in the event of a change ΔH(t) of the determined surroundings brightness H(t), a brightening of the dark image regions in the image data BD2(t) is carried out with a predetermined time delay Δt(ΔH(t)) predetermined depending on ΔH(t). In particular, with a change ΔH(t) of the determined surroundings brightness H(t), the gradation curve GK(H(t)) is changed with a predetermined time delay Δt(ΔH(t)) depending on ΔH(t). As a result of the time delay Δt(ΔH(t)), a change of a degree of brightening is, in principle, only carried out in a delayed manner.

When, for example at a point in time to, the surroundings brightness $H(t_0)$ is increased by 1000 lux and emerges as a corresponding time delay Δt(ΔH(t))=2 sec, then a change of the degree of brightening or a change of the gradation curve ΔGK(H(t)) would only start or become effective after 2 seconds. If the surroundings brightness H(t) changes within the 2 seconds by −1000 lux i.e., back to the starting value, then no change in the degree of brightening or the gradation curve GHK(H($T_0$)) is advantageously carried out. Advantageously, the time delay Δt(ΔH(t)) for large changes ΔH(t) of the surroundings brightness H(t) is lower than for small changes ΔH(t) of the surroundings brightness H(t).

An advantageous development of the proposed device is characterized in that the image data processing unit is designed and set up in such a way that, with a change ΔH(t)

of the ascertained surroundings brightness H(t), a change of the brightening of the dark image regions in the image data BD2(t) or a change of the gradation curve GK(H(t)) is carried out according to a predetermined constant function HYS(t). Thus, any erratic changes are avoided when projecting the image data BD2(t).

Advantageously, the constant function HYS(t) is dependent on the direction of the change ΔH(t) of the brightness H(t), wherein, with a positive ΔH(t), the brightening of the dark image regions is changed according to a predetermined function HYS1(t) and, with a negative ΔH(t), the brightening of the dark image regions is changed depending on a predetermined function HYS2(t). This enables the predetermination of a function for an increase of the determined surroundings brightness H(t) and a different function for a decrease of the determined surroundings brightness H(t).

Particularly advantageously, the function HYS(t) is depicted as a hysteresis behavior, in particular a time-delayed hysteresis behavior when changing the brightness of dark image regions in the image data BD2(t).

A further aspect of the present invention relates to a vehicle, in particular a road vehicle, a rail vehicle, a water vehicle or an air vehicle, having a device as described above.

A final aspect of the present invention relates to a method for operating a device for projecting image data onto a projection surface of a vehicle windowpane of a vehicle, having the following steps:
 providing image data BD1(t) at an interface,
 recording a surroundings brightness H(t) with a brightness sensor,
 generating image data BD2(t) from the image data BD1(t) by means of an image data processing unit connected to the interface and
 projecting the image data BD2(t) onto the projection surface of the vehicle windowpane by means of a projection unit connected to the image processing unit,
wherein the image data processing unit predetermines a gradation curve GK depending on the recorded surroundings brightness H(t) for the generation of the image data BD2(t) from the image data BD1(t) in such a way that dark image regions lying below a predetermined color brightness threshold value in comparison to image regions lying above the color brightness threshold value in the image data BD2(t) is brightened in comparison to the image data BD1(t) with regard to its color or greyscale spectra, wherein a degree of brightening of the dark image regions in the image data BD2(t) increases with increasing surroundings brightness H(t).

Advantageously, the proposed method comprises the step: ascertaining a current viewing angle region BWB(t) at least of one occupant of the vehicle by means of a system connected to the image data processing unit, wherein the image data processing unit only brightens the dark image regions in the image data BD2(t) that, during their projection onto the projection surface of the vehicle windowpane, lie in the viewing angle range BWB(t).

An advantageous development of the proposed method is characterized in that the brightness sensor has a detection range, and the detection range records a brightness H(t) substantially of a surroundings of the vehicle perceptible for an occupant through the projection surface.

Advantageously, during a change ΔH(t) of the determined surroundings brightness H(t), the image data processing unit carries out a brightening of the dark image regions in the image data BD2(t) with a predetermined time delay Δt(ΔH(t)) depending on ΔH(t).

Advantageously, the image data processing unit in the event of a change ΔH(t) of the ascertained surroundings brightness H(t) carries out a change of the degree of brightening of the dark image regions in the image data BD2(t) according to a predetermined constant function HYS(t). Advantageously, the constant function HYS(t) is dependent on the direction of the change ΔH(t) of the surroundings brightness, wherein, with a positive ΔH(t), the brightening of the dark image regions changes according to a predetermined function HYS1(t) and, in the event of a negative ΔH(t), the brightening of the dark image regions is changed according to a predetermined function HYS2(t).

Particularly advantageously, the function HYS(t) constitutes a hysteresis behavior, in particular a time-delayed hysteresis behavior when changing the brightness of dark image regions in the image data BD2(t).

Further advantages, features and details emerge from the description below in which—optionally with reference to the drawings—at least one exemplary embodiment is described in detail. The same, similar, or functionally identical parts are provided with the same reference numeral.

BRIEF DESCRIPTION OF THE DRAWING FIGURES

Here are shown:
 FIG. 1 a highly schematized construction of a proposed device,
 FIG. 2 an example of a proposed gradation curve, and
 FIG. 3 a highly schematized flowchart of a proposed method.

DETAILED DESCRIPTION

FIG. 1 shows a highly schematized construction of a proposed device for projecting image data onto a projection surface of a vehicle front windowpane of a vehicle, comprising: an interface 101 for providing the image data BD1(t), an image data processing unit 102 connected to the interface 101 for generating image data BD2(t) from the image data BD1(t), a brightness sensor 103 connected to the image data processing unit BD2(t) for recording a surroundings brightness H(t), and a projection unit 104 connected to the image data processing unit 102 for projecting the image data BD2(t) onto the projection surface of the vehicle front windowpane.

The image data processing unit 102 is presently designed and set up in such a way that, depending on the recorded surroundings brightness H(t), a gradation curve GK(H(t)) is predetermined for the generation of the image data BD2(t) from the image data BD1(t) in such a way that dark image regions lying below a predetermined color brightness threshold in comparison to image regions lying above the color brightness threshold are brightened in the image data BD2(t) in comparison to the image data BD1(t), wherein a degree of brightening of the dark image regions in the image data BD2(t) increases with increasing surroundings brightness H(t). This means, in particular, that dark image regions in the image data BD2(t) are depicted in an increasing surroundings brightness H(t) with a greater brightness and, in a decreasing surroundings brightness H(t) with a lower brightness.

The device further comprises a system 105 connected to the image processing unit for ascertaining a current viewing angle range BWB(t) at least of one occupant of the vehicle (driver and/or passenger), wherein the image processing unit only brightens the dark image regions in the image data BD2(*t*) that lie in the viewing angle range BWB(t) during their projection onto the projection surface of the vehicle windowpane.

The brightness sensor preferably has a recording region that records a brightness H(t) substantially of the surroundings perceptible to an occupant through the projection surface.

The image data processing unit is furthermore designed and set up in such a way that, with a change ΔH(t) of the ascertained surroundings brightness H(t), a brightening of the dark image regions in the image data BD2(*t*) is carried out with a predetermined time delay Δt(ΔH(t)) dependent on ΔH(t).

Figure 2:
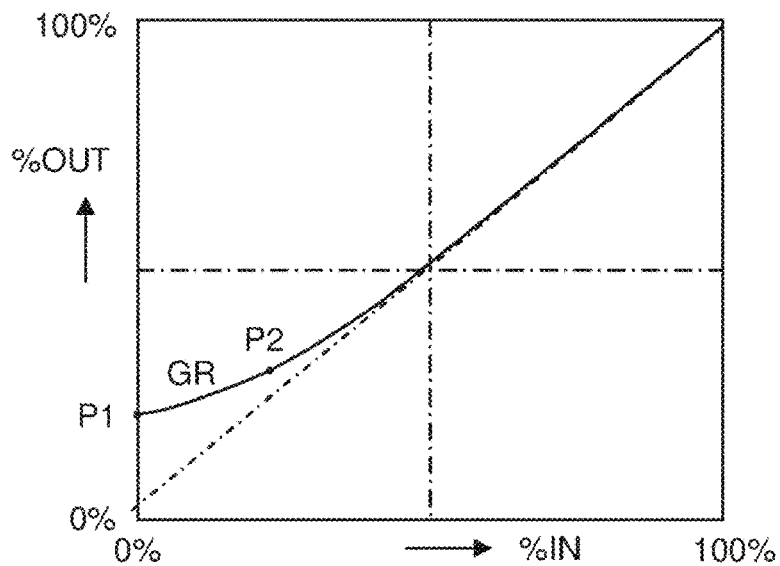

FIG. 2 shows an example of a proposed gradation curve GK(H(t)). The basis of this example is that a brightness sensor on the vehicle ascertains the surroundings brightness H(t) between 1 and 100,000 Im/qm. Depending on the surroundings brightness H(t), the gradation curve GK(H(t)) is ascertained. An algorithm underlies this example, which ascertains two points P1 and P2 of a gradation curve GK(H(t)). In the diagram depicted, the point P1 determines an allocation depending on the surroundings brightness H(t) of % IN=0→% OUT(% IN=0), wherein the following applies: % OUT(% IN=0)≥0, and thus defines an increase (brightening) of the image data for the input value % IN=0. The allocation: % IN=0→% OUT(% IN=0)=0 presently only applies as an exception if the ascertained surroundings brightness H(t) is lower than a threshold value GW, given for a dark night, of a surroundings brightness.

The point P2 presently determines an allocation depending on the surroundings brightness H(t) of:

% IN=25→% OUT(% IN=25)=|% OUT(% IN=0)|+
|% OUT(% IN=0)/2| and thus defines an increase (brightening), depending on the surroundings brightness H(t), of the image data for the input value % IN=25. The point P2 serves to determine the further course of the gradation curve GK(H(t)). The depicted gradation curve GK(H(t)) hugs the dashed diagonal from the point (% IN=50, % OUT=50) and further runs in the direction of the end point of the gradation curve (% IN=100, % OUT=100).

If the recorded surroundings brightness H(t) is changed, then a correspondingly changed gradation curve GK(H(t)) is thus ascertained. If the ascertained surroundings brightness H(t) decreases, then, in this example, the value % OUT(% IN=0) of the point P1 and correspondingly the value % OUT(% IN=25) is reduced. If the ascertained surroundings brightness H(t) decreases below a predetermined threshold value GW, then the gradation curve GK(H(t)) corresponds to the curve shown in the diagram as a dot-dashed diagonal.

Figure 3:
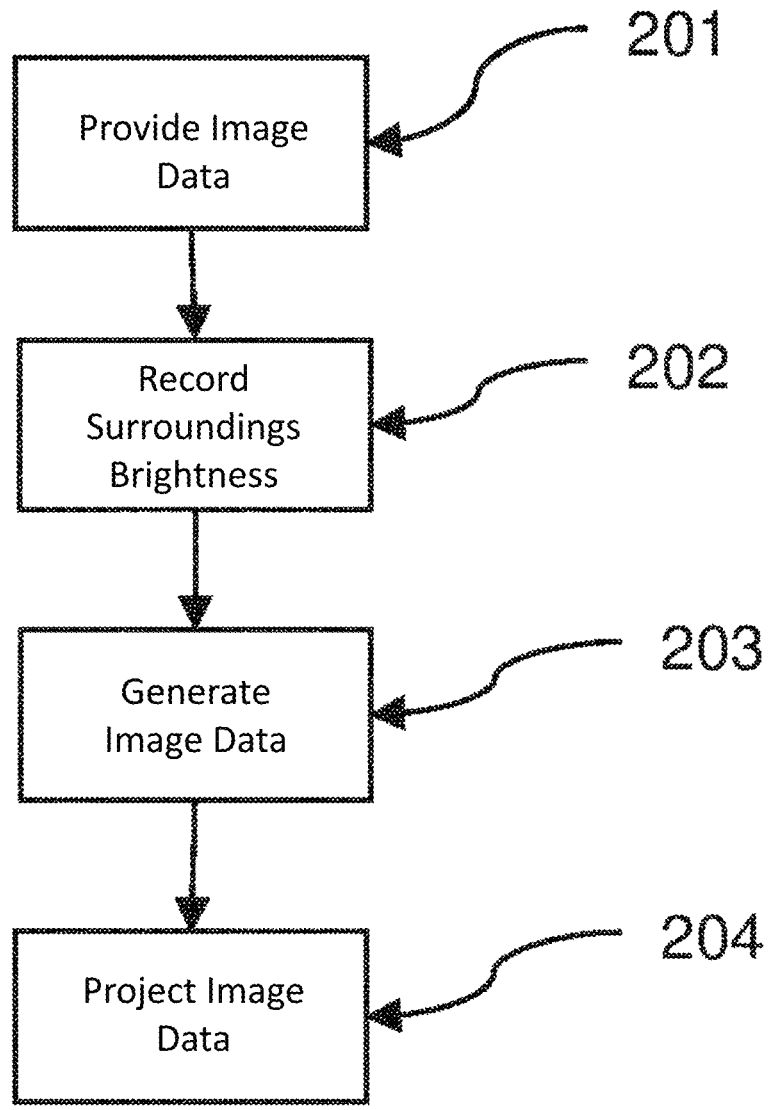

FIG. 3 shows a highly schematized flowchart of a proposed method for operating a device for projecting image data onto a projection surface of a vehicle windowpane of a vehicle, having the following steps: providing 201 image data BD1(*t*) at an interface 101, recording 202 a surroundings brightness H(t) with a brightness sensor 103, generating 203 image data BD2(*t*) from the image data BD1(*t*) by means of an image data processing unit 102 connected to the interface 101, and projecting 204 the image data BD2(*t*) onto the projection surface of the vehicle windowpane by means of a projection unit 104 connected to the image processing unit 102, wherein the image data processing unit 102 predetermines a gradation curve GK depending on the recorded surroundings brightness H(t) for the generation of image data BD2(*t*) from the image data BD1(*t*), such that dark image regions in the image data BD2(*t*) are brightened in comparison to the image data BD1(*t*), wherein a degree of brightening of the dark image regions in the image data BD2(*t*) increases with increasing surroundings brightness H(t).

Although the invention has been illustrated and explained in more detail by preferred exemplary embodiments, the invention is not limited by the disclosed examples, and other variations can be derived from this by the person skilled in the art without leaving the scope of the invention. It is thus clear that there is a plurality of variation possibilities. It is also clear that embodiments mentioned by way of example really only constitute examples that cannot be understood in any way as limiting the scope of protection, the application possibilities or the configuration of the invention, for example. Instead, the description above puts the person skilled in the art in a position to concretely implement the exemplary embodiments, wherein the person skilled in the art, with an understanding of the disclosed inventive idea, can undertake various changes, for example with regard to the function or the arrangement of individual elements mentioned in an exemplary embodiment, without leaving the scope of protection, which is defined by the claims and their legal equivalents, such as somewhat more extensive explanations in the description.

The invention claimed is:

1. A device, comprising:
an image processing unit connected to the interface and configured to generate second image data from first image data;
a brightness sensor connected to the image data processing unit and configured to record brightness surrounding a vehicle as a surroundings brightness; and
a light source connected to the image processing unit and configured to project the second image data onto a projection surface of a windowpane of the vehicle,
wherein the image processing unit is configured to generate the second image data from the first image data depending on the recorded surroundings brightness using a gradation curve that is predetermined in such a way that dark image regions of the first image data lying below a predetermined color brightness threshold compared to image regions lying above the color brightness threshold in the first image data are brightened in the second image data compared to the first image data with regard to color or greyscale spectra, wherein a degree of brightening of the dark image regions in the first image data increases with an increase in the recorded surroundings brightness.

2. The device of claim 1, further comprising:
a system, connected to the image processing unit, configured to detect a current viewing angle range at least of one occupant of the vehicle, wherein the image data processing unit configured in such a way that only the dark image regions in the second image data are brightened, which, when projected onto the projection surface of the vehicle windowpane, are in the current viewing angle range.

3. The device of claim 2, wherein the brightness sensor has a recording region that records a brightness of the surroundings of the vehicle perceptible by an occupant through the projection surface based on the current viewing angle range.

4. The device of claim 1, wherein the image processing unit is configured in such a way that, with a change of the recorded surroundings brightness, a brightening of the dark image regions in the second image data is performed with a predetermined time delay depending on the change of the recorded surroundings brightness.

5. The device of claim 1, wherein the image processing unit is configured in such a way that, with a change of the recorded surroundings brightness, a change of the brightening of the dark image regions in the second image data is carried out according to a predetermined constant function.

6. The device of claim 5, wherein the constant function is dependent on direction of the change of the surroundings brightness, wherein, with a positive change in the surroundings brightness, the brightening of the dark image regions is changed according to a first predetermined function and, with a negative change in the surroundings brightness, the brightening of the dark image regions is changed according to a second predetermined function.

7. The device of claim 6, wherein the constant function exhibits hysteresis behavior.

8. A vehicle, comprising:
a device, which comprises
an image processing unit connected to the interface and configured to generate second image data from first image data;
a brightness sensor connected to the image processing unit and configured to record brightness surrounding a vehicle as a surroundings brightness; and
a light source connected to the image processing unit and configured to project the second image data onto a projection surface of a windowpane of the vehicle,
wherein the image processing unit is configured to generate the second image data from the first image data depending on the recorded surroundings brightness using a gradation curve that is predetermined in such a way that dark image regions of the first image data lying below a predetermined color brightness threshold compared to image regions lying above the color brightness threshold in the first image data are brightened in the second image data compared to the first image data with regard to color or greyscale spectra, wherein a degree of brightening of the dark image regions in the first image data increases with an increase in the recorded surroundings brightness.

9. A method, comprising:
recording, by a brightness sensor, brightness surrounding a vehicle as a surroundings brightness;
generating second image data from the first image data; and
projecting the second image data onto a projection surface of a windowpane of the vehicle windowpane,
wherein the second image data is generated from the first image data depending on the recorded surroundings brightness using a gradation curve that is predetermined in such a way that dark image regions of the first image data lying below a predetermined color brightness threshold compared to image regions lying above the color brightness threshold in the first image data are brightened in the second image data compared to the first image data with regard to color or greyscale spectra, wherein a degree of brightening of the dark image regions in the first image data increases with an increase in the recorded surroundings brightness.

10. The method of claim 9, further comprising:
determining a current viewing angle region of at least of one occupant of the vehicle, wherein, in the generated second image data, only the dark image regions in the second image data lying in the current viewing angle region during projection onto the projection surface of the vehicle windowpane are brightened.

11. The method of claim 10, wherein the brightness sensor has a recording region that records a brightness of the surroundings of the vehicle perceptible by an occupant through the projection surface based on the current viewing angle range.

12. The method of claim 9, wherein with a change of the recorded surroundings brightness, a brightening of the dark image regions in the second image data is performed with a predetermined time delay depending on the change of the recorded surroundings brightness.

13. The method of claim 9, wherein with a change of the recorded surroundings brightness, a change of the brightening of the dark image regions in the second image data is carried out according to a predetermined constant function.

14. The method of claim 13, wherein the constant function is dependent on direction of the change of the surroundings brightness, wherein, with a positive change in the surroundings brightness, the brightening of the dark image regions is changed according to a first predetermined function and, with a negative change in the surroundings brightness, the brightening of the dark image regions is changed according to a second predetermined function.

15. The method of claim 14, wherein the constant function exhibits hysteresis behavior.

* * * * *